July 26, 1960  F. GENTILE  2,946,325
MUFFLER FOR USE WITH CATALYSTS IN INTERNAL COMBUSTION ENGINES
Filed Feb. 14, 1958

INVENTOR.
Frank Gentile
BY Scott L. Howrie

United States Patent Office 2,946,325
Patented July 26, 1960

2,946,325

MUFFLER FOR USE WITH CATALYSTS IN INTERNAL COMBUSTION ENGINES

Frank Gentile, 940 E. Turney, Phoenix, Ariz.

Filed Feb. 14, 1958, Ser. No. 715,312

2 Claims. (Cl. 123—119)

This invention concerns mufflers for use with catalytic agents to diminish production of noxious gases by internal combustion engines.

Heretofore catalytic agents in many forms have been used in mufflers and in connection with automobiles and even, in some instances, in connection with the fuel used. The muffler herein disclosed is adapted for use with catalytic agents which are first introduced into the intake manifold and combustion chambers of an internal combustion engine, so that the walls of these parts are coated with substances which will minimize the production of noxious gases. With catalytic agents of this type it is necessary that moisture be present in the intake manifold and combustion chambers as well as the exhaust manifold. The amount of this moisture is small but is nevertheless very necessary to insure the operation of the catalyzer.

In view of the foregoing one of the objects of this invention is to provide a muffler which will minimize the sound of the exhaust with minimum back pressure and will divert the exhaust gases through devious passageways to enable them to expand and cool before they are exhausted into the atmosphere; said muffler having a return pipe connected to its outlet end for attachment to the inlet manifold of the engine, to furnish moist vapors to the inner surfaces of the intake manifold, the engine combustion chamber surfaces, and of the exhaust manifold.

Another object is to provide a muffler and means of connection to an internal combustion engine whereby the muffler will minimize the sound of the engine exhaust and, at the same time, cool the exhaust gases to a point where moisture contained in the exhaust gases is available for injection into the intake manifold of the engine; said muffler being provided with a series of chambers including a final chamber wherefrom the comparatively cooled gases near the outlet of the muffler may be conducted, by a tube attached to the muffler, to the engine intake manifold whereby catalytic agents on the walls of the engine intake manifold and the combustion chambers of the engine will be activated by the moisture.

Another object of the invention concerns the provision of a tubular fitting and connection between the intake manifold and the muffler including means whereby a liquid catalyst may be introduced into the intake manifold, when desired, and this opening then shut off, and thereafter a second opening between the intake manifold and the muffler opened a predetermined degree so that the amount of cooled exhaust gases entering the intake manifold can be adequately regulated.

I attain the foregoing objects by means of the devices, parts and combinations of parts illustrated in the accompanying drawings in which—

Similar numerals refer to similar parts in the several views.

Figure 1:
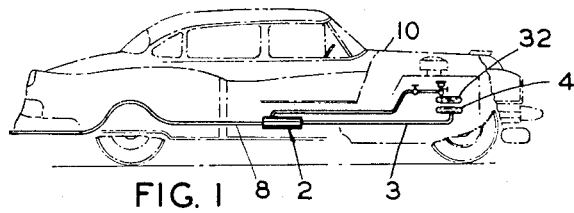
Figure 1 is a semi-diagrammatical side elevational view of the installation of my muffler in an automotive vehicle showing the connections between the muffler and the intake manifold of an internal combustion engine in said automobile.
Figure 2:
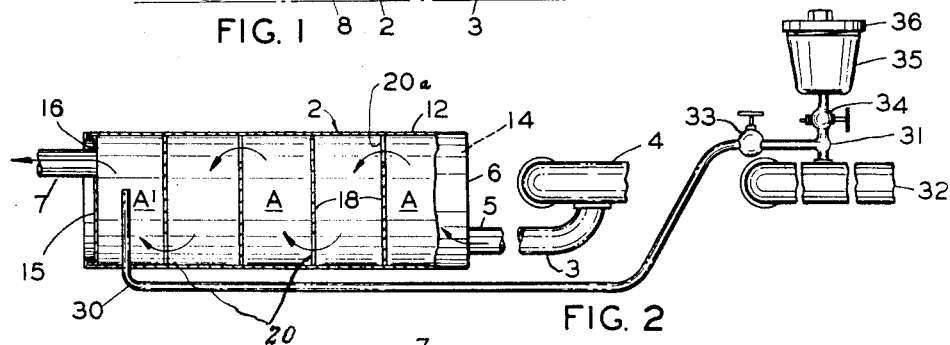
Figure 2 is a side elevational view of my muffler and the connections to the intake manifold.
Figure 3:
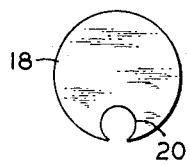
Figure 3 is an elevational view of one of the baffles used within the muffler shell.
Figure 4:
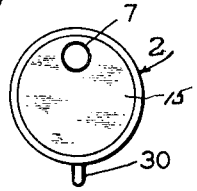
Figure 4 is an end elevational view of the muffler.

Referring to the drawings, 2 indicates the muffler in general; 3 indicates the exhaust pipe from the engine manifold 4; and 5 indicates the exhaust coupling at the intake end 6 of the muffler body. Numeral 7 indicates the fitting at the outlet end of the muffler which is connected to the exhaust tail pipe 8 of the automobile 10.

The muffler is composed of a cylindrical shell 12 having a disc or plate 14 closing its forward end, and a disc or plate 15 closing its rear end. At the lower side of disc 14 there is an opening to receive the inlet pipe connection 5. At the opposite or upper side of the muffler shell there is an opening 16 in disc 15 which receives the tail pipe fitting 7. Within the body of the muffler there are several baffles 18 which extend transversely to the longitudinal axis of the muffler body. These are disposed at spaced intervals and welded or otherwise fixed in place within the shell 12. Each baffle has a hole near its edge which may partially extend into its peripheral edge. These holes are indicated by numeral 20.

The baffle discs are positioned within the shell 12 so that the hole 20A, for example, is on the opposite side of the muffler from the opening which admits in that fitting 5. Each successive baffle has its circulating hole 20 on the opposite side of the muffler body from the hole in the preceding baffle.

This construction forms a series of chambers A through which the exhaust gases must pass in a zig zag manner. That is, gases entering each chamber must traverse its width before traveling on to the next chamber. This construction forces the gases to traverse a longer path than they would without the baffles.

The final chamber, indicated as A-1, is at the outlet end of the muffler and here the gases, having traversed all other chambers, are expanded and cooled and in a condition to furnish moisture to the intake manifold 32. That is, the moisture in the exhaust gases is nearer the condensation point than it is when it leaves the engine exhaust. A pipe 30 extends into chamber A-1 and connects outward to a T fitting 31 on the intake manifold 32. Regulating valve 33 controls the flow through this pipe and is positioned near the T 31. One branch of the T extends upward to a valve 34 which connects to a funnel pot 35 having a cover 36.

The funnel pot is intended to be filled with a liquid type catalyzer and while the engine is running valve 33 is closed and valve 34 opened to admit the liquid catalyzer into the intake manifold. From this manifold the catalyzer will work through the intake manifold, combustion chambers of the engine and outward into the exhaust manifold 4.

This catalyzer is of a type containing material which breaks down under the heat of the operation of the engine and readily combines with carbon and other substances on the interior surfaces of the parts mentioned and is adsorbed on these surfaces. The catalyzer is liquid and may consist, for example, of $(CH_3(CH_2)_{16}CO_2H + KOH$ and $H_2O)$ aqueous solution of stearic acid and potassium hydroxide.

After the engine interior surfaces are charged with catalyzer and the valve 34 closed the valve 33 is opened so that the suction on the intake manifold 32 draws a predetermined amount of exhaust gases from the final chamber A-1 of the muffler into the engine.

The moisture thus obtained is sufficient to activate the catalyst on the surfaces of the engine parts mentioned and in this manner the objectionable gases in the exhaust are minimized if not totally eliminated by the action of the catalyzer. Other catalysts may be used. The exact chemical action is not the subject of this application, however, the apparatus described makes the use of the catalyst possible, and a distinct drop in the carbon monoxide content of the exhaust gases is noted, and no objectionable deposits of free carbon are formed.

I claim:

1. A muffler for use with an internal combustion engine having an intake manifold and exhaust manifold with the interior surfaces coated with catalytic material of the type requiring moisture to be active and, adapted to expand and cool exhaust gases, and, consisting of an elongated tubular body closed at the ends by plates, an eccentrically disposed inlet fitting and pipe on one end plate connecting the muffler to the exhaust manifold of said engine, an eccentrically disposed fitting leading to an exhaust tail pipe attached to the end closing plate at the other end of said muffler body, a plurality of transverse baffles disposed in spaced relation within said muffler body forming a series of longitudinally positioned compartments; said baffles having eccentrically positioned holes disposed adjacent alternate sides of said body so that exhaust gases passing through said muffler body will be directed in a zig zag manner; a pipe connecting the interior of the compartment next to said exhaust tail pipe through a control valve to the intake manifold of said engine to admit controlled quantities of moist exhaust gases from said muffler to said manifold to activate the catalytic substances on the inner surfaces of the engine manifolds, and a covered pot funnel connected by a pipe opening through a valve to said intake manifold adapted to admit fluid catalysts to the intake manifold of said engine.

2. Apparatus for reducing the production of noxious gases in an internal combustion engine comprising, an internal combustion engine having an intake manifold, an exhaust manifold and combustion chambers, a catalyst adapted to reduce the volume of noxious gases in the exhaust gases when slightly moistened, a coating of said catalyst on the inner surfaces of said manifolds and combustion chambers, a muffler for expanding and cooling the exhaust gases composed of a tubular body shell closed at each end, a fitting at one end connected to the engine exhaust manifold, an outlet fitting at the other end connected to an exhaust tail pipe, a series of longitudinally spaced transverse baffle plates within said body forming a series of longitudinally disposed expansion chambers; said baffle plates having opening at their edges disposed so as to direct exhaust gases passing through said muffler in zig zag path, and a return pipe to convey expanded, cooled and moist gases from the muffler to the engine intake manifold to activate the catalyst coating the inner surfaces of said manifolds and combustion chambers, said return pipe connecting the compartment adjacent the outlet fitting of said muffler with the intake manifold of said engine, and a gas flow regulating valve in said pipe.

References Cited in the file of this patent

UNITED STATES PATENTS

| | | |
|---|---|---|
| 1,756,897 | Bilsky | Apr. 29, 1930 |
| 2,349,675 | Pratt | May 23, 1944 |
| 2,354,179 | Blanc | July 25, 1944 |
| 2,456,213 | Pelc | Dec. 14, 1948 |

FOREIGN PATENTS

| | | |
|---|---|---|
| 225,106 | Switzerland | Apr. 16, 1943 |